US010871675B2

(12) United States Patent
Enomoto

(10) Patent No.: US 10,871,675 B2
(45) Date of Patent: Dec. 22, 2020

(54) DISPLAY DEVICE USING LIGHT REFLECTOR

(71) Applicant: SHARP KABUSHIKI KAISHA, Sakai (JP)

(72) Inventor: Hiromi Enomoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 160 days.

(21) Appl. No.: 16/131,704

(22) Filed: Sep. 14, 2018

(65) Prior Publication Data

US 2019/0086707 A1 Mar. 21, 2019

(30) Foreign Application Priority Data

Sep. 15, 2017 (JP) ................................ 2017-177562

(51) Int. Cl.
| | |
|---|---|
| *G02F 1/1335* | (2006.01) |
| *G02F 1/1343* | (2006.01) |
| *G02F 1/13357* | (2006.01) |
| *C09K 11/71* | (2006.01) |

(52) U.S. Cl.
CPC .... *G02F 1/133555* (2013.01); *G02F 1/13439* (2013.01); *G02F 1/133514* (2013.01); *G02F 1/133528* (2013.01); *G02F 1/133617* (2013.01); *C09K 11/717* (2013.01); *G02F 2001/133614* (2013.01); *G02F 2001/133618* (2013.01)

(58) Field of Classification Search
CPC ... G02F 1/133555; G02F 2001/133614; G02F 1/133617; G09K 11/717
See application file for complete search history.

(56) References Cited

U.S. PATENT DOCUMENTS

| | | | |
|---|---|---|---|
| 2012/0313906 A1 | 12/2012 | Tamaki et al. | |
| 2016/0195752 A1 | 7/2016 | Tamaki et al. | |
| 2018/0039125 A1* | 2/2018 | Kubota | ............ G02F 1/133514 |

FOREIGN PATENT DOCUMENTS

JP 2012-255908 A 12/2012

* cited by examiner

*Primary Examiner* — Paisley L Wilson
(74) *Attorney, Agent, or Firm* — ScienBiziP, P.C.

(57) ABSTRACT

A display device includes a display panel including a display surface, a light transmission mode converter configured to convert light transmission mode, a light reflective portion disposed on an opposite side of the light transmission mode converter from the display surface and configured to reflect light entered through the display surface toward the display surface, a light transmissive portion disposed on the opposite side of the light transmission mode converter from the display surface and configured to transmit light, and a color filter that is disposed closer to the display surface than the light reflective portion and the light transmissive portion are, and a light storing portion configured to store light to emit light having a complementary color of a color exhibited by the color filter, the light storing portion being disposed on an opposite side of the light transmissive portion from the display surface.

5 Claims, 6 Drawing Sheets

DISPLAY DEVICE USING LIGHT REFLECTOR

CROSS REFERENCE TO RELATED APPLICATION

This application claims priority from Japanese Patent Application No. 2017-177562 filed on Sep. 15, 2017. The entire contents of the priority application are incorporated herein by reference.

TECHNICAL FIELD

The technology described herein relates to a display device.

BACKGROUND

A semi-transmissive display device disclosed in Japanese Unexamined Patent Application Publication No. 2012-255908 has been known as one example. The display device includes reflective electrodes for respective pixels. The display device is capable of both a reflective display using the reflective electrodes and a transmissive display using spaces between the reflective electrodes of the pixels.

SUMMARY

In such a configuration, a transmissive display is provided by using a backlight on the rear surface of the display panel, requiring power for driving the backlight. There is a need for development of a display device that uses less power.

The technology described herein was made in view of the above circumstance and an object thereof is to provide a display device that uses less power.

To solve the above problem, a display device according to the technology described herein includes a display panel and a light storing portion. The display panel includes a display surface, a light transmission mode converter configured to convert light transmission mode, a light reflective portion disposed on an opposite side of the light transmission mode converter from the display surface and configured to reflect light entered through the display surface toward the display surface, a light transmissive portion that is disposed on the opposite side of the light transmission mode converter from the display surface and configured to transmit light, and a color filter that is disposed closer to the display surface than the light reflective portion and the light transmissive portion are. The light storing portion is configured to store light to emit light having a complementary color of a color exhibited by the color filter. The light storing portion is disposed on an opposite side of the light transmissive portion from the display surface.

The light reflective portion enables a display using external light, and the light transmissive portion and the light storing portion enable a display using light from the light storing portion. The light storing portion enables the display device to use less power than one using a backlight. Furthermore, a particular color is given by the material of the light reflective portion or the color of external light, for example, to the reflection light from the light reflective portion in some cases. The color filter enables adjustment of the color of the reflection light, improving display quality. Furthermore, since the light storing portion emits a complementary color of the color filter, the display color provided by the light from the light storing portion is less likely to be affected by the color filter.

The technology described herein provides a display device that uses less power.

DETAILED DESCRIPTION

First Embodiment

Figure 1:
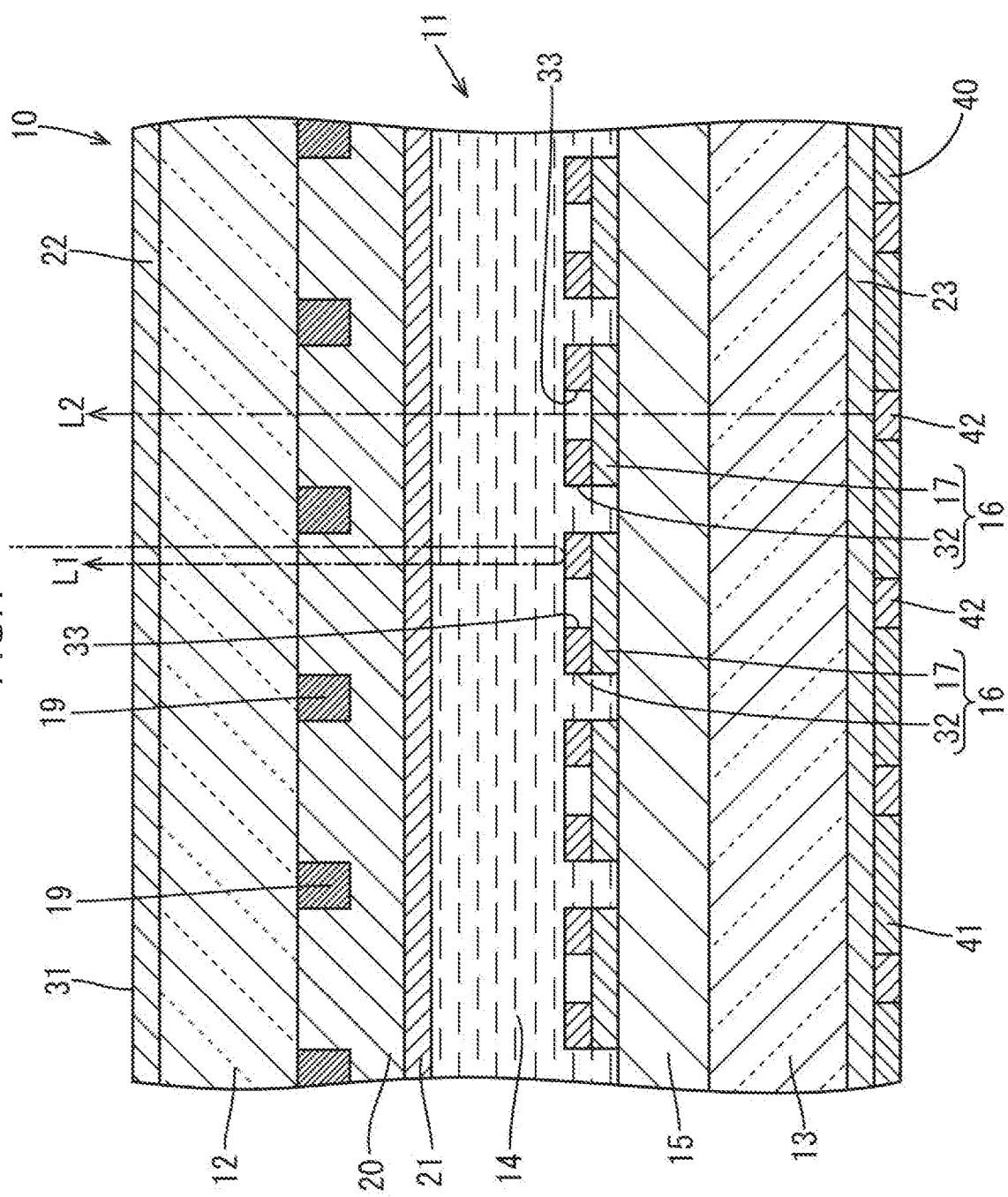
FIG. 1 is a cross-sectional view illustrating a liquid crystal display device according to a first embodiment of the technology described herein.

A first embodiment of the technology described herein is described with reference to FIGS. 1 to 2. As illustrated in FIG. 1, a liquid crystal display device 10 includes a semi-transmissive type liquid crystal panel 11 (display panel) and a light storing sheet 40 that applies light to the liquid crystal panel 11. The liquid crystal panel 11, which is a semi-transmissive type liquid crystal panel, is capable of a reflective display and a transmissive display. In the reflective display, external light (ambient light, environment light) entered through a display surface 31 (front side, upper side in FIG. 1) is reflected and used to provide a display. In the transmissive display, light from the light storing sheet 40 on the side opposite the display surface 31 (rear side, lower side in FIG. 1) is transmitted and used to provide a display. The external light used in the reflective display includes sunlight and interior light. The liquid crystal display device 10 according to the embodiment is applicable to a wearable device, such as a smartwatch, but the application is not limited to the wearable device.

As illustrated in FIG. 1, the liquid crystal panel 11 includes front and rear substrates 12 and 13 facing each other and a liquid crystal layer 14 (light transmission mode converter) disposed between the substrates 12 and 13. The liquid crystal layer 14 contains liquid crystal molecules, which are substances whose light transmission mode is changed by application of an electrical field. One of the substrates 12 and 13 that is on the front side is a counter substrate 12 (CF substrate, common substrate) and one on the rear side is an array substrate 13 (device substrate, active matrix substrate, TFT substrate). The liquid crystal layer 14 is sealed by a sealing portion (not illustrated) disposed between outer peripheral portions of the substrates 12 and 13.

In the liquid crystal panel 11, a central section of the display surface 31 is a display area on which an image is displayed and a frame-shaped outer peripheral section surrounding the display area is a non-display area on which an image is not displayed. In the non-display area, the sealing portion is located. In the display area, pixels 16 configured to display an image are located. The substrates 12 and 13 each include a substantially transparent glass substrate and multiple films formed by a known photolithography method on the glass substrate. The liquid crystal panel 11 is a normally black mode liquid crystal panel that provides a monochrome display in the display area and provides a black display when the tone value (transmittance) is the minimum with no application of current (no application of voltage to the pixel 16, which is described later), for example.

The pixels 16 are each connected to a switching device (not illustrated), such as a TFT on the array substrate 13, and a memory circuit (such as Static RAM, which is not illustrated). The pixels 16 are charged to a predetermined potential and the potential is kept for a predetermined time period by driving of the switching devices and using data stored in the memory circuit. In other words, the liquid crystal panel 11 is a memory liquid crystal panel that uses less power to display a still image.

Figure 2:
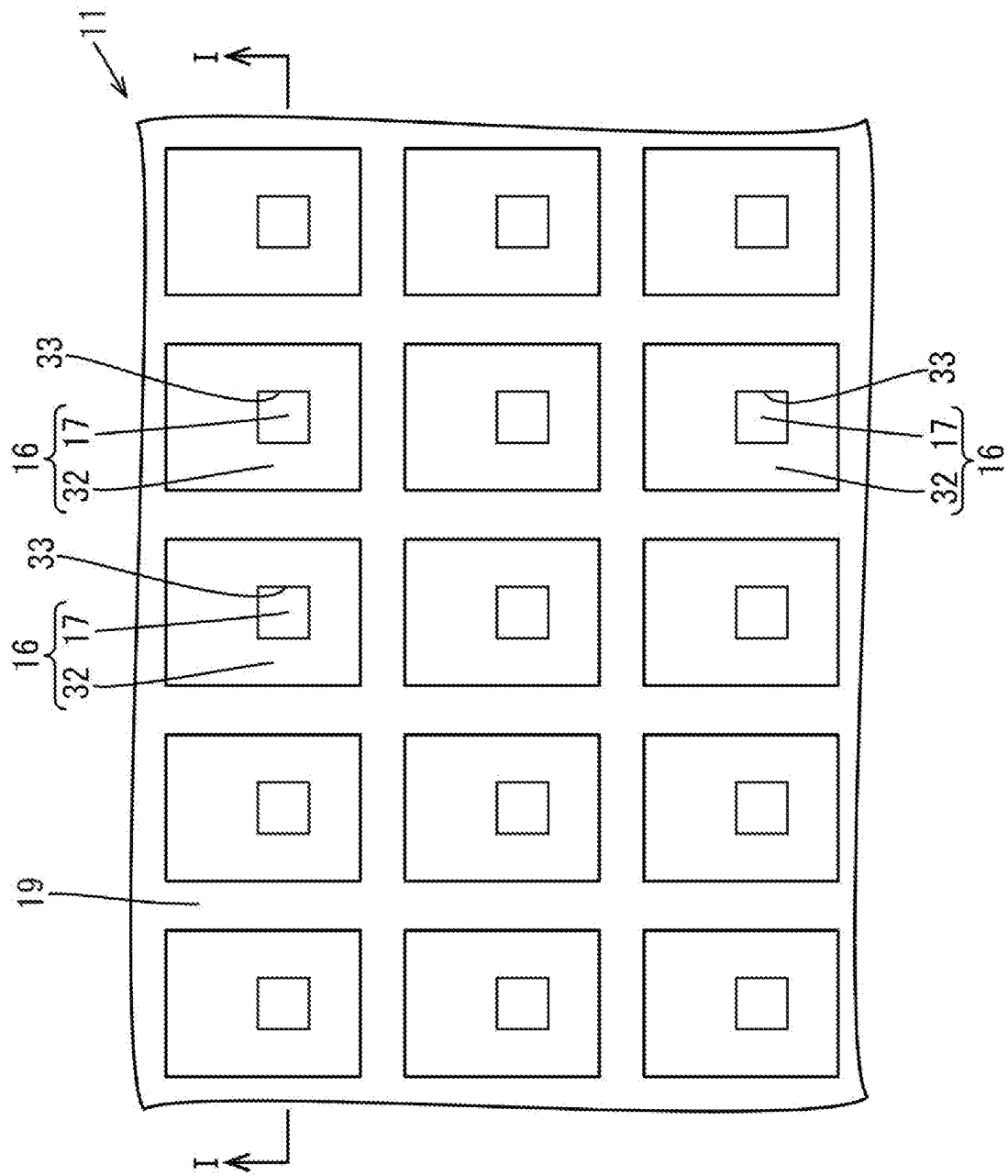
FIG. 2 is a plan view illustrating pixels included in a liquid crystal panel.

As illustrated in FIGS. 1 and 2, the pixels 16 are planarly arranged in a matrix in the display area of the array substrate 13 over the display surface 31. The pixels 16 each include a transmissive pixel electrode 17, which is a lower layer (on a side away from the liquid crystal layer 14) and a reflective pixel electrode 32, which is an upper layer (on a side adjacent to the liquid crystal layer 14), on the transmissive pixel electrode 17. The transmissive pixel electrode 17 is formed of a transparent electrode film having light transmission properties.

The reflective pixel electrode 32 (light reflective portion) is formed of a reflective metal material and is located on an opposite side of the liquid crystal layer 14 from the display surface 31. The reflective pixel electrode 32 is configured to reflect light (external light) entered through the display surface 31 toward the display surface 31. The reflection light reflected by the reflective pixel electrode 32 (see an arrow L1 in FIG. 1) travels toward the counter substrate 12 through the liquid crystal layer 14 and is used to provide a reflective display. The reflective pixel electrode 32 has an opening 33 (light transmissive portion) extending therethrough at a portion thereof. This enables the light from the light storing portion 42 of the light storing sheet 40 (see an arrow L2 in FIG. 1) to travel toward the liquid crystal layer 14 through the transmissive pixel electrode 17 and the opening 33. The light from the light storing sheet 40 that has passed through the liquid crystal layer 14 travels toward the counter substrate 12 and is used to provide a transmissive display. As illustrated in FIG. 2, the opening 33 may have a rectangular shape and have a smaller area than the rest of the reflective pixel electrode 32 not including the opening 33. A planarizing film 15 is disposed on the array substrate 13 and located below the transmissive pixel electrode 17. The planarizing film 15 eliminates unevenness below the planarizing film 15, which may be caused by wiling lines and TFTs (not illustrated) connected to the pixels 16. The planarizing film 15 is mainly formed of an organic insulating material and the pixels 16 are disposed on the surface planarized by the planarizing film 15.

As illustrated in FIG. 1, a light blocking portion 19 that blocks light, a color filter 20, and a counter electrode 21 facing the pixels 16 are disposed on the counter substrate 12. As illustrated in a plane view of FIG. 2, the light blocking portion 19 has a grid-like shape and separates the pixels 16 planarly arranged in a matrix in the display area. The light blocking portion 19 blocks light traveling between adjacent pixels 16, giving the display independence of the pixels 16. The color filter 20 is disposed closer than the reflective pixel electrode 32 (opening 33) to the display surface 31 and exhibits blue. Specifically described, the color filter 20 contains a pigment or a colorant that selectively transmits blue light having a wavelength in a wavelength range of blue (about 420 nm to about 500 nm) and absorbs light having a wavelength outside the above wavelength range (green light and red light).

In the liquid crystal panel capable of both the reflective display and the transmissive display, the display color during the reflective display is more likely to be yellowish than the display color during the transmissive display. One of the reasons is that the material of the reflective pixel electrode may cause the light reflected by the reflective pixel electrode to be yellowish. Furthermore, in the reflective display, the optical path length of the light passing through the liquid crystal layer is twice as long as that in the transmissive display because the external light reciprocates in the liquid crystal layer. The amount of light having a long wavelength is likely to increase compared with the amount of light having a short wavelength as the optical path length increases. This is one of the reasons that the display color in the reflective display tends to be yellowish.

The color filter 20 exhibiting blue, which is a complementary color of yellow, on the counter substrate 12 suppresses the display color during the reflective display from becoming yellowish. The color filter 20 covers the pixels 16 in the display area. The counter electrode 21 is formed of a transparent electrode film as the transparent pixel electrode 17 and a constant reference potential (common potential) is applied to the counter electrode 21. Thus, there is a potential difference between the counter electrode 21 and the pixels 16 facing the counter electrode 21 based on the voltage supplied to the pixels 16. The alignment of the liquid crystal material in the liquid crystal layer 14 near the pixel 16 is controlled by using the potential difference, enabling the pixel 16 to provide a display. The counter electrode 21 is disposed to face all the pixels 16. Furthermore, in the liquid crystal panel 11, a polarizing plate 22 is disposed on the front surface of the counter substrate 12 and a polarizing plate 23 is disposed on the rear surface of the array substrate 13. Examples of the material of the reflective pixel electrode 32, which is likely to make the reflection light yellowish, include, but not limited to, a combination of ITO, molybdenum, and aluminum and a combination of ITO and silver alloy.

The light storing sheet 40 is disposed on an opposite side of the pixel 16 (opening 33) from the display surface 31 and includes a sheet-like base 41 and light storing portions 42 in the base 41. The light storing portion 42 stores light to emit yellow light, which has a complementary color of the blue color filter 20. The light storing portions 42 overlap the respective openings 33 of the pixels 16 from the side opposite the display surface 31. Examples of the light storing portion 42, which emits yellow light, include, but not limited to, a phosphorescent pigment including alkaline earth aluminate phosphorescent agent colored with a yellow pigment. Examples of the phosphorescent pigment include "phosphorescent pigment 301Y (Mo.xAl$_2$O$_3$:ySiO$_2$Eu) available from Luminous Corporation. The light storing portion 42 may include a phosphorescent material and a fluorescent material that emits light upon receiving light from the fluorescent material.

Next, advantages of this embodiment are described. In this embodiment, the reflective pixel electrode 32 enables a display using external light, and the opening 33 and the light storing portion 42 enable a display using light from the light storing portion 42. The light storing portion 42 enables the liquid crystal display device 10 to use less power than one using a backlight. Furthermore, a particular color is given by the material of the reflective pixel electrode 32 or the color of external light, for example, to the light reflected by the reflective pixel electrode 32 in some cases. The color filter 20 enables adjustment of the color of the reflection light, improving display quality. Furthermore, since the light storing portion 42 emits a complementary color of the color filter 20, the display color provided by the light from the light storing portion 42 is less likely to be affected by the color filter 20.

The liquid crystal panel 11 includes multiple pixels 16. The pixels 16 each include the transmissive pixel electrode 17 having light transmission properties and the reflective pixel electrode 32 overlapping the transmissive pixel electrode 17 and having light reflective properties. The light from the light storing portion 42 travels toward the display surface 31 through the transmissive pixel electrode 17 and the light transmissive portion (opening 33). This enables a display using light from the light storing portion 42.

Furthermore, the reflective pixel electrode 32 is formed of a metal material, the color filter 20 is blue, and the light storing portion 42 stores light to emit yellow light. When the reflective pixel electrode 32 is formed of a metal film, the reflection light from the reflective pixel electrode 32 may be yellowish. This is characteristic of the metal. The blue color filter 20 suppresses the display color during the display using the reflection light from becoming yellowish. Furthermore, the display color provided by the light from the light storing portion 42 is unlikely to be made bluish by the color filter 20, because the light storing portion 42 emits yellow light, which has a complementary color of the color filter 20. This allows the reflective display and the transmissive display to have the display whiteness level closer to each other.

Furthermore, the light storing portions 42 overlap the openings 33 from the side opposite the display surface 31. This allows the light from the light storing portions 42 to readily pass through the openings 33, improving light use efficiency.

Second Embodiment

Figure 3:
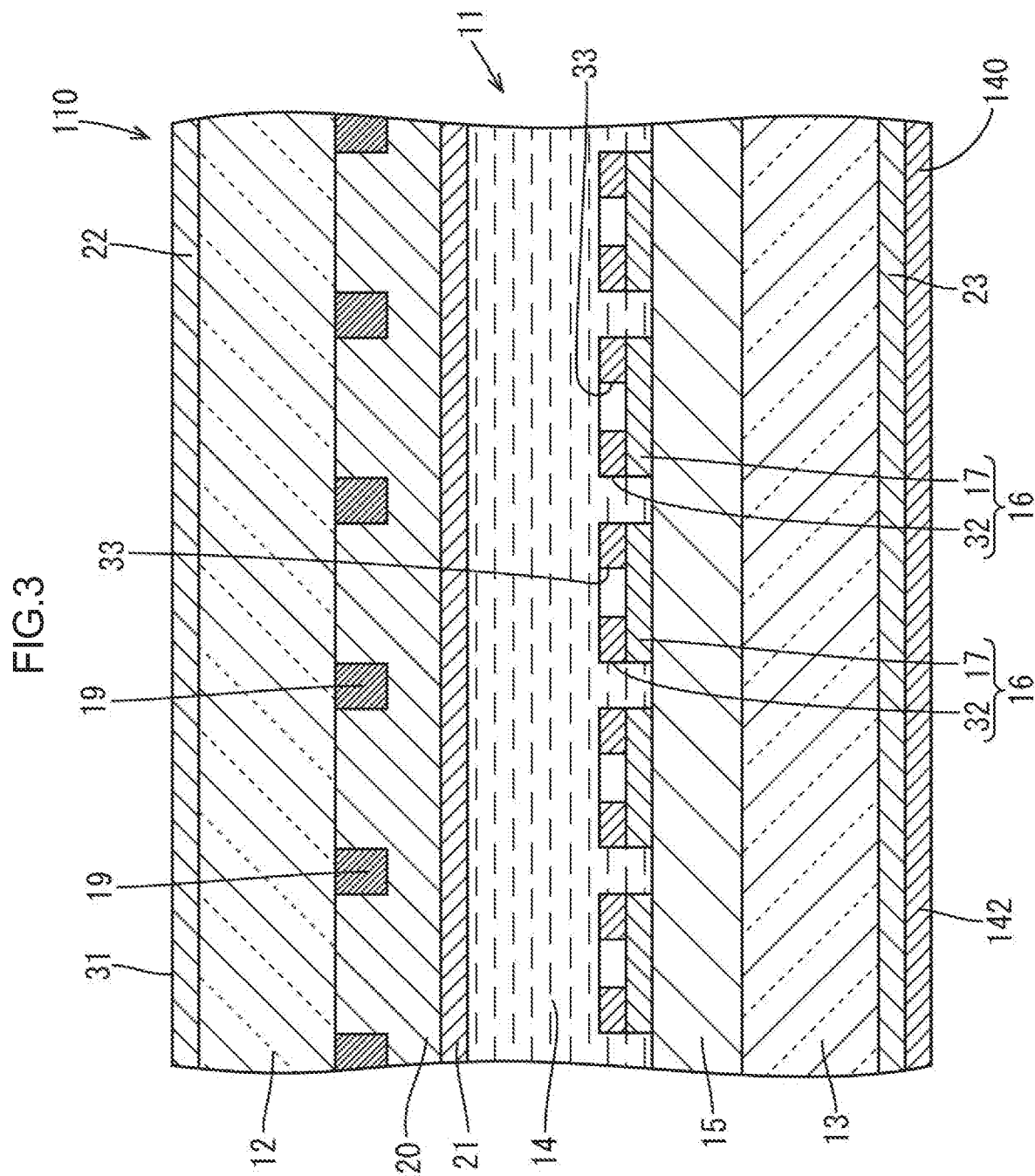
FIG. 3 is a cross-sectional view illustrating a liquid crystal display device according to a second embodiment.

Next, a second embodiment of the technology described herein is described with reference to FIG. 3. The same components as those in the above embodiment are assigned the same reference numerals and are not repeatedly described. In a liquid crystal display device 110 according to the second embodiment, a light storing portion 142 extends over an entire area of the light storing sheet 140.

Third Embodiment

Figure 4:
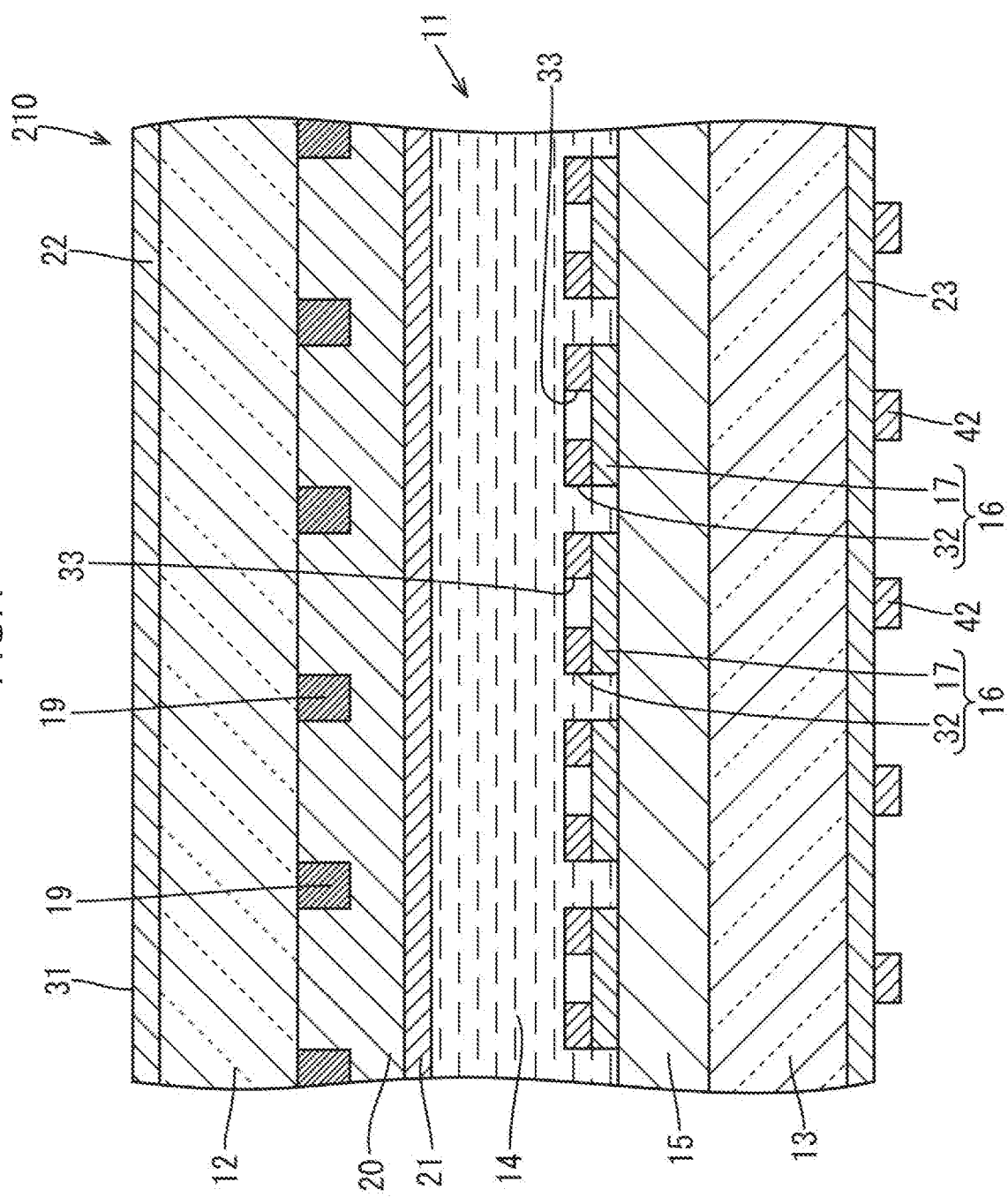
FIG. 4 is a cross-sectional view illustrating a liquid crystal display device according to a third embodiment.

Next, a third embodiment of the technology described herein is described with reference to FIG. 4. The same components as those in the above embodiments are assigned the same reference numerals and are not repeatedly described. A liquid crystal display device 210 according to the third embodiment does not include a light storing sheet. The light storing portions 42 overlap the respective openings 33.

Fourth Embodiment

Figure 5:
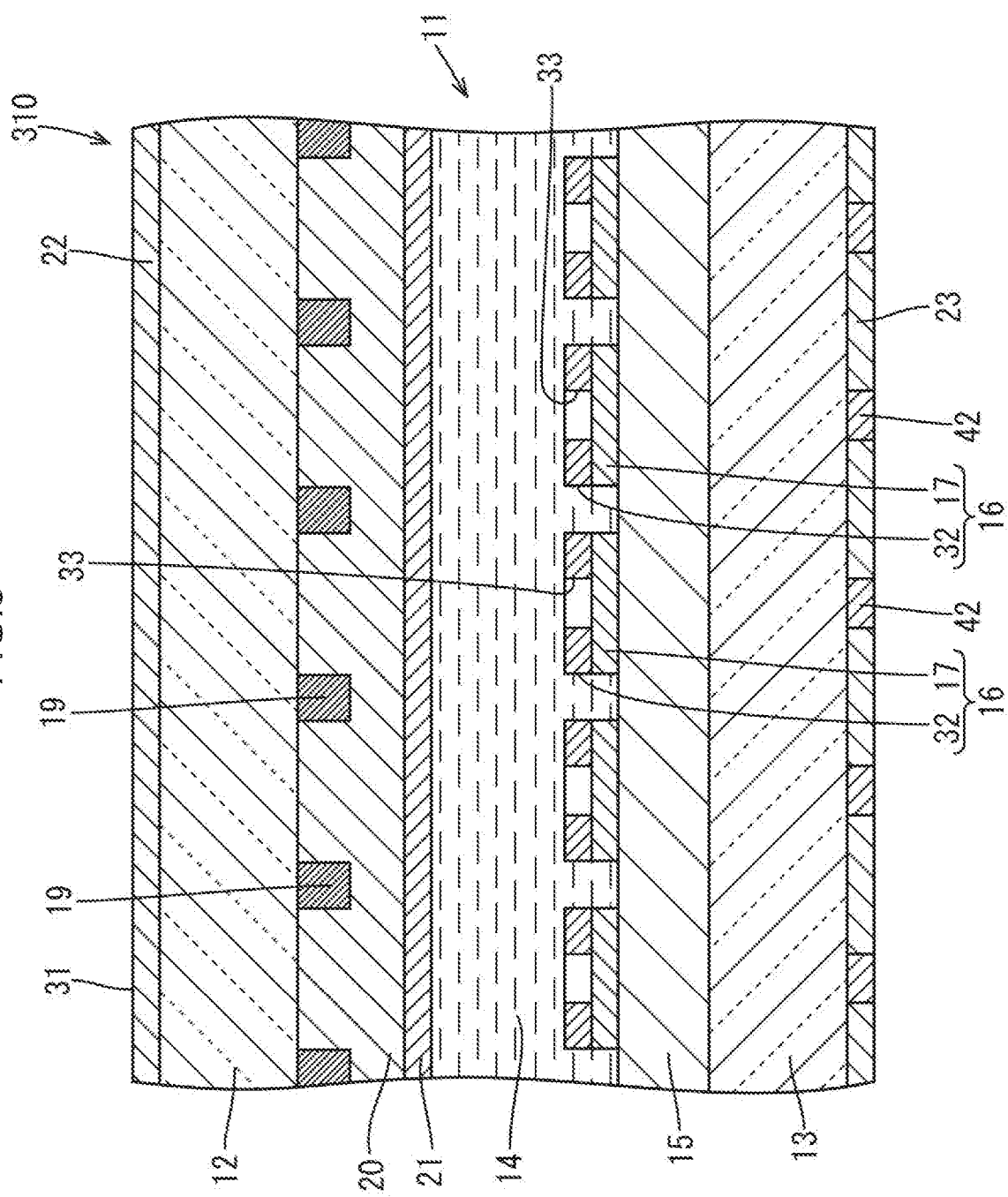
FIG. 5 is a cross-sectional view illustrating a liquid crystal display device according to a fourth embodiment.

Next, a fourth embodiment of the technology described herein is described with reference to FIG. 5. The same components as those in the above embodiments are assigned the same reference numerals and are not repeatedly described. A liquid crystal display device 310 according to the fourth embodiment does not include a light storing sheet. The light storing portions 42 are disposed in the polarizing plate 23, which is located on an opposite side of the liquid crystal panel 11 from the display surface 31 and the light storing portions 42 overlap the respective openings 33. The integration of the polarizing plate 23 and the light storing portion 42 facilitates the mounting operation.

Fifth Embodiment

Figure 6:
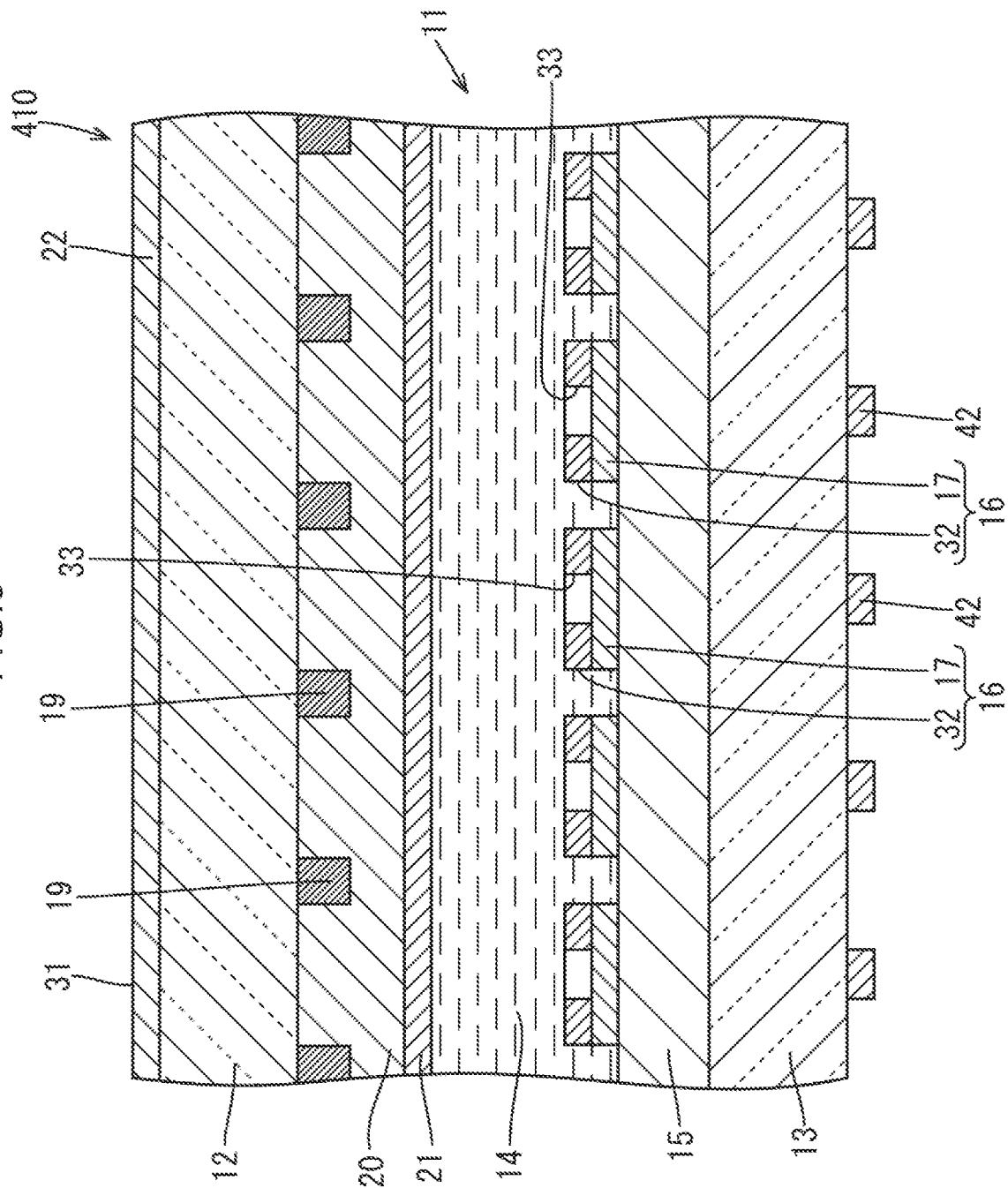
FIG. 6 is a cross-sectional view illustrating a liquid crystal display device according to a fifth embodiment.

Next, a fifth embodiment of the technology described herein is described with reference to FIG. 6. The same components as those in the above embodiments are assigned the same reference numerals and are not repeatedly described. A liquid crystal display device 410 according to the fifth embodiment does not include a polarizing plate located on a side opposite the display surface 31. The light storing portions 42 are disposed on the rear surface of the array substrate 13.

Other Embodiments

The technology described herein is not limited to the embodiments described above and illustrated by the drawings. For example, the following embodiments will be included in the technical scope.

(1) In the above-described embodiments, the light transmissive portion is the opening 33 in the reflective pixel electrode but not limited to the opening 33. For example, the light transmissive portion may be a space between the adjacent reflective pixel electrodes.

(2) In the above embodiments, the light transmission mode converter is the liquid crystal layer 14 but not limited to the liquid crystal layer 14. The light transmission mode converter may be any component configured to convert light transmission mode such that an image is displayed on the display surface. For example, the light transmission mode converter may be a micro mechanical shutter (MEMS) in each of the pixels.

(3) In the above embodiments, the color of the color filter 20 is blue and the color of light from the light storing portion 42 is yellow. However, the colors are not limited to these examples. The color of the color filter 20 may be suitably changed in accordance with the color of the reflection light from the reflective pixel electrode 32. The color of the light from the light storing portion 42 may be any complementary color of the color filter 20. For example, when the color filter 20 is red, the light storing portion 42 may be configured to emit cyan light, and when the color filter 20 is green, the light storing portion 42 may be configured to emit magenta light. The color of the color filter 20 and the color of light from the light storing portion 42 may be switched. For example, when the color filter 20 is yellow, the light storing portion 42 is configured to emit blue light, when the color filter 42 is cyan, the light storing portion 42 is configured to emit red light, and when the color filter 20 is magenta, the light storing portion 42 is configured to emit green light.

The invention claimed is:
1. A display device comprising:
a display panel including:
 a display surface;
 a light transmission mode converter configured to convert light transmission mode;
 a light reflective portion disposed on an opposite side of the light transmission mode converter from the display surface and configured to reflect light entered through the display surface toward the display surface;

a light transmissive portion disposed on the opposite side of the light transmission mode converter from the display surface and configured to transmit light; and a color filter that is disposed closer to the display surface than the light reflective portion and the light transmissive portion are; and a light storing portion configured to store light to emit light having a complementary color of a color exhibited by the color filter, the light storing portion being disposed on an opposite side of the light transmissive portion from the display surface; wherein the light storing portion includes a phosphorescent pigment including alkaline earth aluminate phosphorescent agent.

2. The display device according to claim 1, wherein the color filter is blue and the alkaline earth aluminate phosphorescent agent is colored with a yellow pigment.

3. The display device according to claim 1, wherein the display panel includes a plurality of pixels, the pixels each include a transmissive pixel electrode having light transmission properties and a reflective pixel electrode overlapping the transmissive pixel electrode and having light reflection properties, the light reflective portion is the reflective pixel electrode, and the light transmissive portion is an opening in the reflective pixel electrode.

4. The display device according to claim 1, wherein the light storing portion overlaps the light transmissive portion from an opposite side from the display surface.

5. The display device according to claim 1, further comprising a polarizing plate on a surface of the display panel opposite from the display surface, wherein the light storing portion is included in the polarizing plate.

* * * * *